K. B. KILBORN.
RING CORE.
APPLICATION FILED JUNE 3, 1916.

1,275,942.

Patented Aug. 13, 1918.
3 SHEETS—SHEET 1.

Witness
C. W. P. Newbold

Inventor,
Karl B. Kilborn.
By C. L. Landon
Attorney

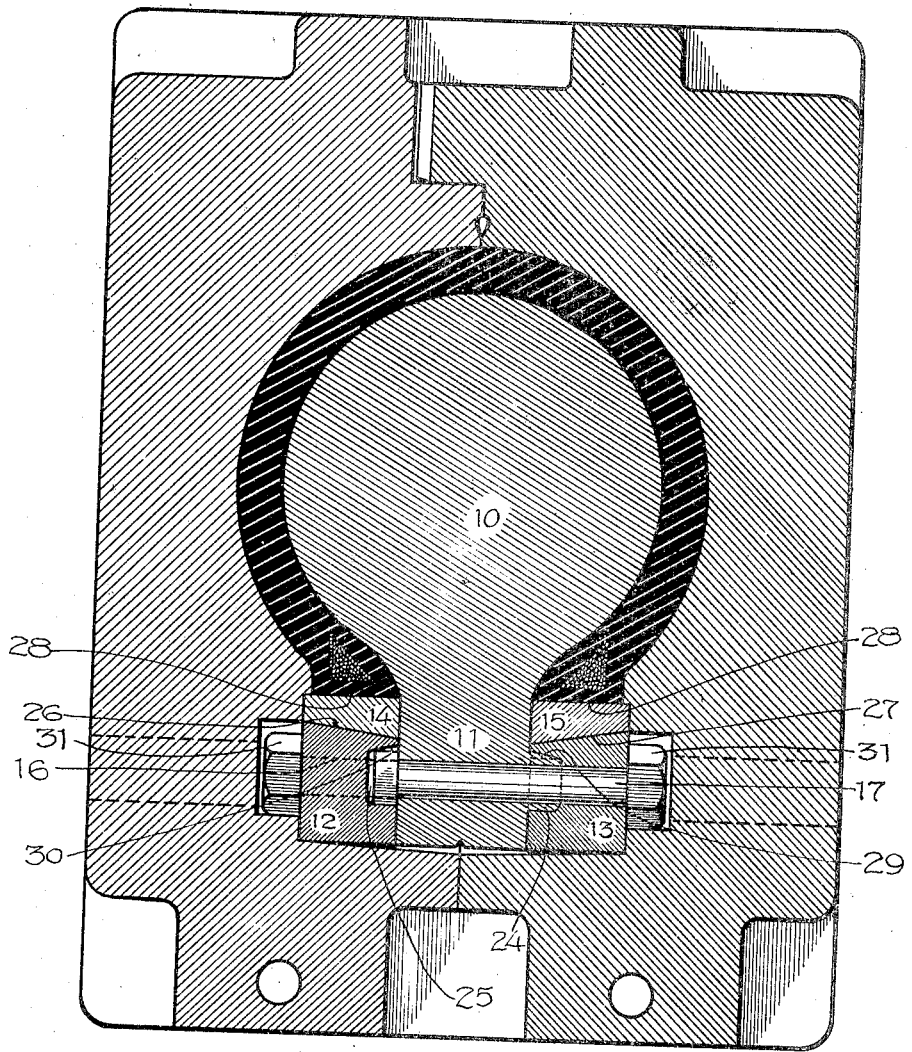

K. B. KILBORN.
RING CORE.
APPLICATION FILED JUNE 3, 1916.
1,275,942.
Patented Aug. 13, 1918.
3 SHEETS—SHEET 3.
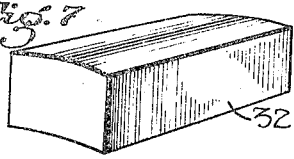
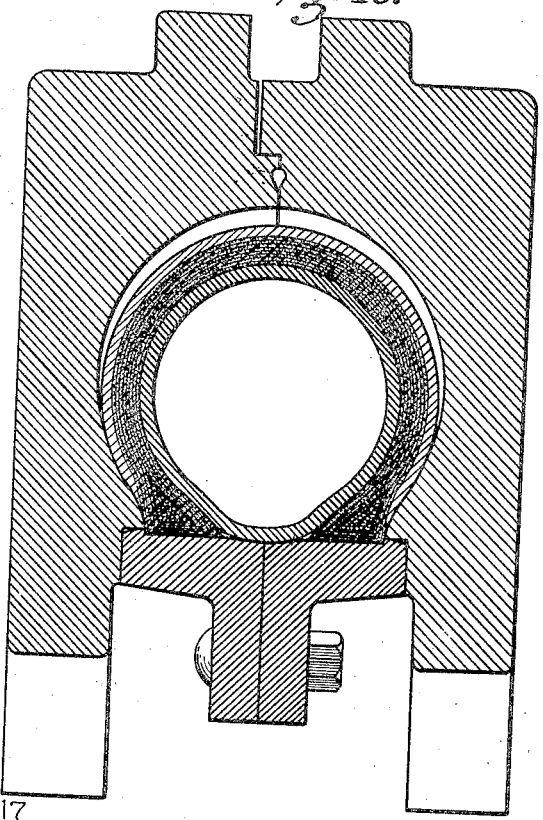
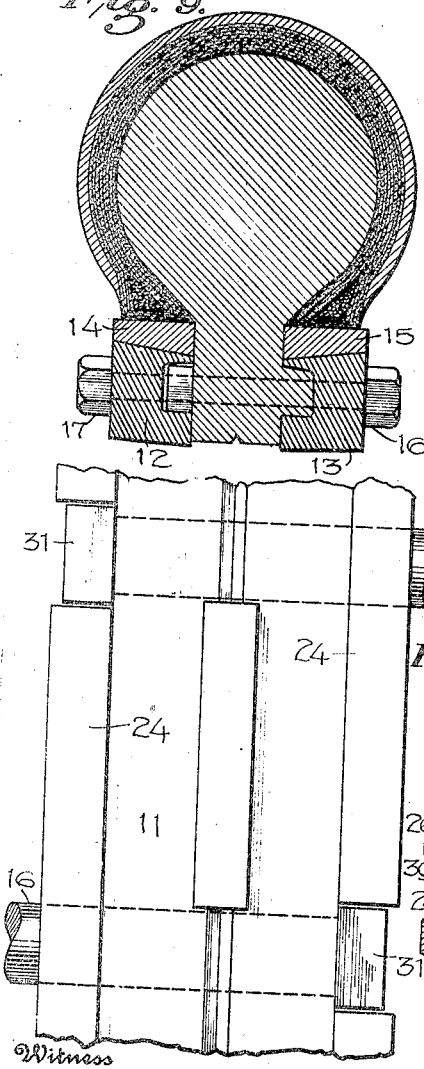
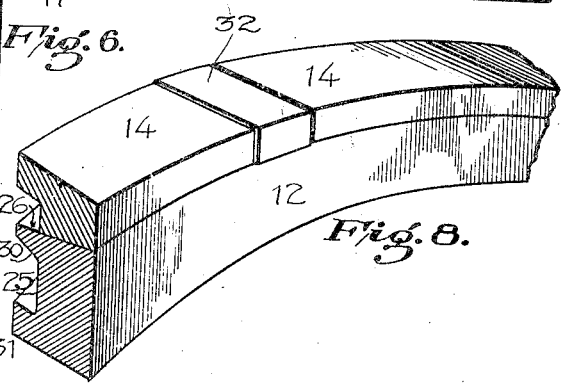
Inventor,
Karl B. Kilborn.
Witness

UNITED STATES PATENT OFFICE.

KARL B. KILBORN, OF AKRON, OHIO, ASSIGNOR TO THE GOODYEAR TIRE AND RUBBER COMPANY, OF AKRON, OHIO, A CORPORATION OF OHIO.

RING-CORE.

1,275,942.

Specification of Letters Patent.

Patented Aug. 13, 1918.

Application filed June 3, 1916. Serial No. 101,561.

*To all whom it may concern:*

Be it known that I, KARL B. KILBORN, a citizen of the United States, residing at Akron, in the county of Summit and State of Ohio, have invented new and useful Improvements in Ring-Cores, of which the following is a specification.

The present invention relates to new and useful improvements in ring cores of the type employed in building up the fabric or cord carcass of automobile and other pneumatic vehicle tires.

In accordance with the present practice of building up tire carcasses upon the core, the inner plies of fabric are "stitched" into close conformity to the core and the outer plies have their edge portions lapped around beads generally of the non-extensible type. In the smaller sizes of tires no particular manufacturing difficulties are encountered but when the larger tires from 7″ up to 12″ are built, the relatively greater difference between the inner and outer circumferences of the tires results in the presence at the edges of the tire of an excess amount of fabric which must be crowded around the beads. Moreover, in the case of the larger tires, the fabric employed is relatively heavier and stiffer and cannot be lapped smoothly across the base faces of the beads by the tire builder. The fabric at the bead edges then wrinkles and bulks out beyond its proper limits.

When the fabric carcass has been built up upon the core, both are placed in a mold for curing. The type of mold customarily employed is provided with laterally and inwardly projecting rings on its mating sections, these rings being of such size as to engage the "toes" of the tire where the edges of the outer fabric plies have been lapped over the beads. If these lapped fabric edges are loose, wrinkled or bulkier than is expected in the finished product, the mold rings do not smoothly engage the tire toes when the mold sections are brought together, but instead do a permanent damage to the beads and toes of the tire by "chewing" a way through the excess fabric.

Being cognizant of the above conditions, it is therefore one of the principal objects of my present invention to equip the ring core with means whereby mechanical pressure acting outwardly and radially from the axis of the core may be exerted against the edge portions of the plies of fabric which lie against the base face of the beads with the result that the wrinkles in these edge portions of the fabric will be eliminated and the fabric compressed so as to occupy the zone of predetermined dimensions.

A more specific object of my present invention is to provide a ring core which is of the well known sectional type but is so designed that it may be readily equipped with expansible rings adapted to be applied to the neck of the core and expanded, by a pair of complemental wedge rings, to iron the wrinkles out of the fabric at the toe of the tire prior to the application of the mold sections to the carcass for curing.

It is another object of the invention to make these expansible ironing rings capable of individual application to or removal from the ring core so that the worker may continue to follow the present practice of working the beads into the tire one at a time.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which similar reference numbers designate corresponding parts:

Fig. 5 is a transverse sectional view taken through a mold in which is placed a tire mounted upon the present core;

Fig. 6 is a bottom plan view of a section of the core;

Fig. 7 is a perspective detail of the member employed to close the gap in the ironing ring;

Fig. 8 is a sectionally perspective view of the method of employment of the member shown in Fig. 7;

Fig. 9 is a transverse sectional view through the core as employed in the building up of a cord tire; and Fig. 10 is a transverse sectional view taken through a mold at the beginning of the final vulcanizing process for the cord tire of Fig. 9.

Figure 1:
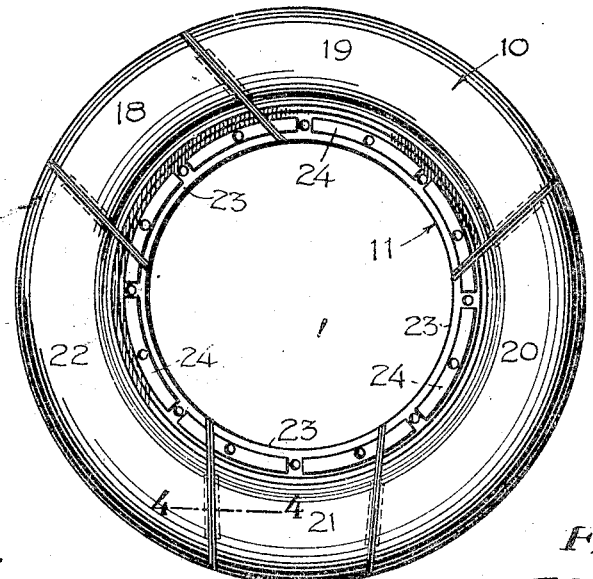
Figure 1 is a side elevational view of the ring core of this invention, the sections thereof being assembled for use.
Figure 4:
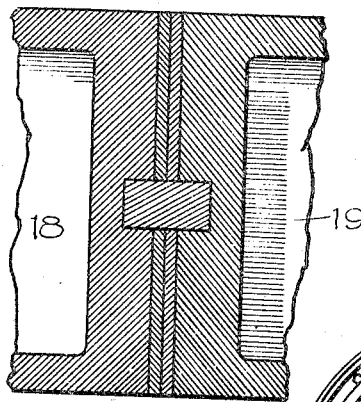
Fig. 4 is a sectional view taken on the plane indicated by the lines 4—4, Fig. 1, showing the method of joining the core sections.
Figure 2:
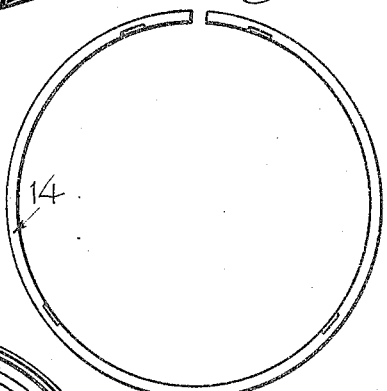
Fig. 2 is a detail elevational view of the expansible ironing ring, *per se;*
Figure 3:
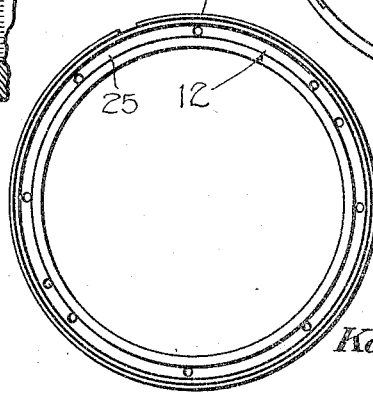
Fig. 3 is a similar view of the core ring.

The core of the present invention includes as its essential elements of construction a core body 10 having a neck 11 (see Fig. 1), a pair of wedge rings 12 and 13 (see Fig. 5), a pair of expansible ironing rings 14 and 15 and two sets of bolts 16 and 17 which are applicable to the neck for drawing the wedge rings inwardly to effect the required expansion of the expansible ironing rings and a resultant ironing of the fabric at the base faces of the tire beads for removal of the wrinkles in the fabric.

The ring core employed in the present invention is for the most part of a conventional design employed in building up non-extensible bead carcasses comprising as it does five sections 18, 19, 20, 21 and 22, which may be solid as shown or hollow if desired, and are adapted to mate as in Fig. 1 forming a complete annulus. The bodies of these core sections are equipped with neck sections 23 which mate as shown in Fig. 1 to form the annular internal neck for the core. This neck is, as best shown in Figs. 1, 6, 8 and 9, provided on each side face with a plurality of equidistantly and circumferentially spaced and alined segmental lugs 24. The spaces between lugs on one side of the neck are staggered with respect to the spaces between lugs of the other side of the neck as best disclosed in Fig. 6. This arrangement of the lugs is necessary in order that the heads of the set of bolts 16 (preferably eight in number) which secure the expanding wedge ring 12 in place upon the neck may be disposed so as not to interfere with the application of the other expanding wedge ring 13. It will be apparent that these bolts 16 have their heads received in the spaces between the lugs on one side of the neck and on that side thereof opposed to the ring 12 while the bolts 17 which secure the other wedge ring 13 in place have their heads located in the spaces between the lugs on the opposite side of the neck. Thus the expansible ironing rings 14 and 15 may be separately applied or removed during the manufacture of the tire.

The expanding wedge rings are provided on their faces with recesses 25 which receive the lugs 24 as in Figs. 8 and 9. The outer faces 26 of these expanding or wedging rings are beveled as in Fig. 9 so that they may be engaged with the oppositely beveled inner faces 27 of the expansible ironing rings in a manner to effect the expansion of these rings when drawn inwardly toward the core neck. The outer face of the ironing rings extend at right angles to the plane of the ring core and may, therefore, be so expanded as to properly compress the fabric at the base face 28 of the bead and thereby iron out all wrinkles caused by the crowding of the excess fabric about the bead.

It is preferable that the outer curved faces 29 of the lugs 24 be beveled or sloped oppositely to the inner faces 27 of the ironing rings and that the outer wall 30 of the recess 25 in each wedge ring be beveled to mate with the faces 29 of the lugs. By this construction, the tightening of the nuts 31 of the sets of bolts 16 and 17 will serve both to wedge the rings 12 and 13 more firmly upon the lugs and to expand the ironing rings all the more forcibly against the tire base flanges. This particular bevel of the faces of the lugs and the engaging walls of the recess 24 is of further advantage in that it positively insures proper placement of the wedge rings against the core neck, relieves the bolts of the lateral strains, and insures uniform expansion of all portions of each ironing ring.

The expansible ironing rings are of the split type and when each has been drawn into proper engagement with the neck by the application of nuts to its set of securing bolts and has been expanded to properly iron out the wrinkles in the fabric around the tire base flanges or beads, a small plug 32 of the type shown in Fig. 7 is inserted as in Fig. 8 between the ends of the expansible ironing ring.

The present core is not limited in use to the ironing of the bulky and wrinkled bead portions of fabric tire but may be employed to advantage in connection with the manufacture of cord tires. When employed in this connection the cord tire is first laid up upon the core and the expansible rings are employed in a manner previously set forth to iron out wrinkles and properly dispose the ends of the cords against the bead. The tire is then removed from the core and placed upon a rim as in Fig. 10 which permits the employment of an air bag during the vulcanization of the tire.

It should now be noted that the primary advantage offered by my present invention regardless of whether it is employed in the manufacture of cord or fabric tires is that it makes possible the ironing out of the wrinkles in the carcass material, at the zone in which the material is necessarily crowded, prior to the application of the mold sections. A complemental advantage is that the mold sections employed in the curing of the tire built upon my present core need not be provided with the usual internal rings with the result that the liability of damage to the fabric about the beads during the application of mold sections is eliminated.

While the core ironing rings and wedging rings are herein disclosed and described as being particularly adapted for use in connection with non-extensible straight side beads, it is to be understood that every feature of the invention may be employed with the same efficiency where the beads are of the straight side non-extensible type, the extensible straight side type, non-extensible clencher or extensible clencher type, the effect which the expansion of the ironing rings has upon the fabric at the bead being substantially the same in each instance.

It will be understood that when a clencher tire is built up on a core having ironing rings constructed in accordance with the present invention the outer faces of the tire are properly channeled or curved to correspond with the curvature of the clencher type of bead.

What I claim is:

1. A ring core for use in building pneumatic tire carcasses including an annular body having an internal annular neck; means movable radially outwardly on each side of the neck member and adapted to be forced into engagement with the wrinkled fabric at the bead of a tire built upon the core; and means for moving said first means radially to force it against the fabric for ironing out the wrinkles therein.

2. A ring core including a body member having an internal annular neck; a pair of expansible rings adapted to be placed one on each side face of the neck; and wedge rings for each side of the neck adapted to be drawn inwardly toward the neck for expanding the adjacent ring.

3. A ring core including an annular body member having an internal annular neck; an expansible tire engaging ring movable radially on each side of the neck; and means operable for expanding said ring radially.

4. A ring core including a body member having an internal annular neck; a pair of expansible rings adapted to be placed one on each side of the neck; wedge rings for each side of the neck, said wedge rings being adapted to be drawn inwardly toward the neck for expanding the adjacent ring; and means for detachably securing the wedge rings in place upon the neck said means being adapted for independent removal of the wedge rings.

5. A ring core including a body member having an internal annular neck; an expansible ironing ring on each side of the neck; laterally movable means on each side of the neck for actuating the ring thereon; and means for holding the said means in position and for shifting said means laterally to expand the expansible rings.

6. A ring core including a body member having an internal annular neck; an expansible pressing member on each side of the neck; and wedge members laterally movable with respect to the neck for expanding a pressing member outwardly.

7. A ring core for use in building pneumatic tire carcasses including a body member having an internal annular neck; a pressing member movable on each side of the neck member and adapted to be forced into engagement with the wrinkled fabric at the bead of the tire built upon the core; and a wedging means on each side of the neck movable laterally with respect to the neck for exerting an outward radial pressure against the first means for ironing out the wrinkles in the fabric at the bead of the tire.

8. A ring core for use in building pneumatic tire carcasses including a body member having an internal annular neck; a pair of expansible rings adapted to be placed one on each side of the neck and to be expanded for finally shaping the fabric at the bead of the tire casing before curing; a pair of wedge rings adapted to be placed one on each side of the neck, each of said wedge rings and the adjacent expansible rings having mating beveled faces whereby the inward movement of the wedge rings toward the neck will expand the expansible rings; and a set of bolts for securing each of said rings in place upon the neck, each set of bolts being independently removable and each wedge ring being removed independently of the other wedge ring.

9. A ring core including a body-portion and an annular neck, an expansible member movable radially on the core, and a pressure-exerting member in engagement with the expansible member and movable in respect thereto and in relation to the annular neck for expanding that member radially.

10. A ring core including an annular neck, an expansible member movable radially thereon, and a pressure-exerting member having a sliding engagement with the expansible member to expand the expansible member radially in relation to the neck-portion.

11. A ring core including a body-portion and an annular neck-portion, an expansible member movable radially on the neck-portion for compressing the bead-portion of a tire on the core, and a pressure-exerting member having a sliding engagement with the expansible member and movable at an angle to the expanding movement thereof.

12. A ring core including a body-portion and a neck-portion; companion expansible members movable radially, one on each side of the neck-portion; and companion pressure-exerting members movable toward each other and in relation to the neck-portion and having a sliding engagement with the expansible members, whereby the lateral movement of the pressure-exerting members effects radial movement of the expansible members.

13. A ring core including a body-portion and a neck-portion; companion expansible members movable radially one on each side of the neck-portion; companion pressure-exerting members movable toward each other and in relation to the neck-portion and having a sliding engagement with the expansible members, whereby the lateral movement of the pressure-exerting members effects radial movement of the expansible members; and means active on the pressure-exerting members for effecting their lateral movement.

14. A ring core including a body-portion and a neck-portion; companion expansible members movable radially, one on each side of the neck-portion; companion pressure-exerting members movable toward each other and in relation to the neck-portion and having a sliding engagement with the expansible members, whereby the lateral movement of the pressure-exerting members effects radial movement of the expansible members; means active on the pressure-exerting members for effecting their lateral movement; and means carried by the neck-portion and engageable by the expansible members for mating one with the other.

15. A ring core including a neck-portion, annular wedging members disposed at opposite sides of the neck-portion and movable laterally in relation thereto, expansible members encompassing said wedging members, and means active on the wedging members for effecting their movement one toward the other and also the expansion of said expansible members.

16. A ring core including a neck-portion, annular wedging members disposed at opposite sides of the neck-portion and movable laterally in relation thereto, expansible members encompassing said wedging members, means active on the wedging members for effecting their movement one toward the other and also the expansion of said expansible members, and means carried by the neck-portion for guiding the movement of the wedging members.

In testimony whereof I have signed my name in the presence of two subscribing witnesses.

KARL B. KILBORN.

Witnesses:
  B. J. McDanel,
  Wm. G. Griffin.